(12) United States Patent
Ottaviano

(10) Patent No.: US 9,754,050 B2
(45) Date of Patent: Sep. 5, 2017

(54) PATH-DECOMPOSED TRIE DATA STRUCTURES

(75) Inventor: Giuseppe Ottaviano, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/406,549

(22) Filed: Feb. 28, 2012

(65) Prior Publication Data
US 2013/0226885 A1 Aug. 29, 2013

(51) Int. Cl.
*G06F 17/30* (2006.01)
(52) U.S. Cl.
CPC .............................. *G06F 17/30961* (2013.01)
(58) Field of Classification Search
None
See application file for complete search history.

(56) References Cited

U.S. PATENT DOCUMENTS

2006/0206513 A1* 9/2006 Belyavsky ................... 707/102
2008/0046405 A1* 2/2008 Olds et al. ...................... 707/3
2010/0299339 A1 11/2010 Kementsietsidis et al.

OTHER PUBLICATIONS

Grossi et al., Fast Compressed Tries through Path Decompositions, Nov. 22, 2011, http://arxiv.org/abs/1111.5220v1.*
"Natural-user-interface", Apr. 5, 2011, TechTarget, accessed on Nov. 14, 2014 from: http://whatis.techtarget.com/definition/natural-user-interface-NUI?vgnextfmt=print.*
Belazzougui, et al., "Monotome Minimal Perfect Hashing : Searching a Sorted Table with O(1) Accesses", in SODA, 2009, p. 785-794.
Bille, et al., "Random Access to Grammar-Compressed Strings", in Proceedings of SODA, 2011, pp. 373-389.
Kaplan, et al., "A Comparison of Labeling Schemes for Ancestor Queries", in Proceedings of the Thirteenth Annual ACM-SIAM Symposium on Discrete Algorithms, 2002, pp. 954-963.
Canovas, Rodrigo, "Compressed Data Structures for Suffix Trees", In MSC Thesis, University of Chile, Sep. 2010, 102 pages.
Demaineyz, et al., "Confluently Persistent Tries for Efficient Version Control", In Proceedings of 11th Scandinavian Workshop on Algorithm Theory, Jul. 2008, pp. 160-172.
Bagwell, Phil, "Fast and Space Efficient Trie Searches", In Technical Report, EPFL, 2000.
Arroyuelo, et al., "Succinct Trees in Practice", in Alenex, pp. 84-97, 2010.

(Continued)

*Primary Examiner* — Alex Gofman
*Assistant Examiner* — Umar Mian

(57) ABSTRACT

Path-decomposed trie data structures are described, for example, for representing sets of strings in a succinct manner while still enabling fast operations on the string sets such as string retrieval or looking up a string with a specified identifier. A path-decomposed trie is a trie (tree data structure for storing a set of strings) where each node in the path decomposed trie represents a path in the trie. In various embodiments a path-decomposed trie data structure is represented succinctly by interleaving node labels and node degrees in an array and optionally by compressing the node labels using a static dictionary. Node labels may be string characters and a node degree may be a number of children of a node. In some embodiments a path-decomposed hollow trie data structure is used to provide a hash function for string sets.

20 Claims, 8 Drawing Sheets

(56) References Cited

OTHER PUBLICATIONS

Benoit, et al., "Representing Trees of Higher Degree", In Algorithmica, 43(4):275-292, 2005.
Ferragina, et al., "On Searching Compressed String Collections Cache-obliviously", In PODS, pp. 181-190, 2008.
Larsson, et al., "Offline Dictionary-based Compression", In Data Compression Conference, pp. 296-305, 1999.
Okanohara, et al., "Practical Entropy-compressed Rank/Select Dictionary", in Alenex, 2007.
Vigna, "Broadword Implementation of Rank/Select Queries", in WEA, pp. 154-168, 2008.
Grossi and Ottaviano, "Fast Compressed Tries Through Path Decompositions", ALENEX, Jan. 2012.
Grossi and Ottaviano, "Fast Compressed Tries Through Path Decompositions", Slides presented at ALENEX, Jan. 2012.
Farzan, Arash, "Succinct Representation of Trees and Graphs", in PhD Thesis, School of Computer Science, University of Waterloo, 2009, 105 pages.

* cited by examiner

L : t1ri2a1ngle

BP: (　(((　　)

B : 　h　ep1

(spaces added for clarity)

PATH-DECOMPOSED TRIE DATA STRUCTURES

BACKGROUND

Tries are tree data structures for storing a set of strings, where common prefixes are represented by common root-to-node paths. A trie data structure turns a string set into a digital search tree. Several operations may be supported using the data structure, such as mapping the strings to integers, retrieving a string from the trie, performing prefix searches and many others. Thanks to their simplicity and functionality tries may be used in a variety of fields including but not limited to computational biology, data compression, data mining, information retrieval, natural language processing, network routing, pattern matching, text processing and web applications.

A path-decomposed trie is a trie (tree data structure for storing a set of strings) where each node in the path decomposed trie represents a path in the trie. A path-decomposed trie is thus smaller than a trie from which it is formed and this reduces space requirements. Reducing space requirements is increasingly important, for example, for web-scale applications such as internet search engines and others. However, a trade-off may occur between reducing space requirements and reducing running time of the data structures during use for operations such as mapping the strings to integers, retrieving a string from the trie and other queries.

The embodiments described below are not limited to implementations which solve any or all of the disadvantages of known path-decomposed trie data structures.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Path-decomposed trie data structures are described, for example, for representing sets of strings in a succinct manner whilst still enabling fast operations on the string sets such as string retrieval or looking up a string with a specified identifier. A path-decomposed trie is a trie (tree data structure for storing a set of strings) where each node in the path decomposed trie represents a path in the trie. In various embodiments a path-decomposed trie data structure is represented succinctly by interleaving node labels and node degrees in an array and optionally by compressing the node labels using a static dictionary. Node labels may be string characters and a node degree may be a number of children of a node. In some embodiments a path-decomposed hollow trie data structure is used to provide a hash function for string sets.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an information retrieval system, the system described is provided as an example and not a limitation. As those skilled in the art will appreciate, the present examples are suitable for application in a variety of different types of systems in which string sets are to be manipulated.

Details about the embodiments described herein are given in "Fast compressed tries through path decompositions" by Grossi and Ottaviano, ALENEX January 2012 which is incorporated herein by reference in its entirety.

Figure 1:
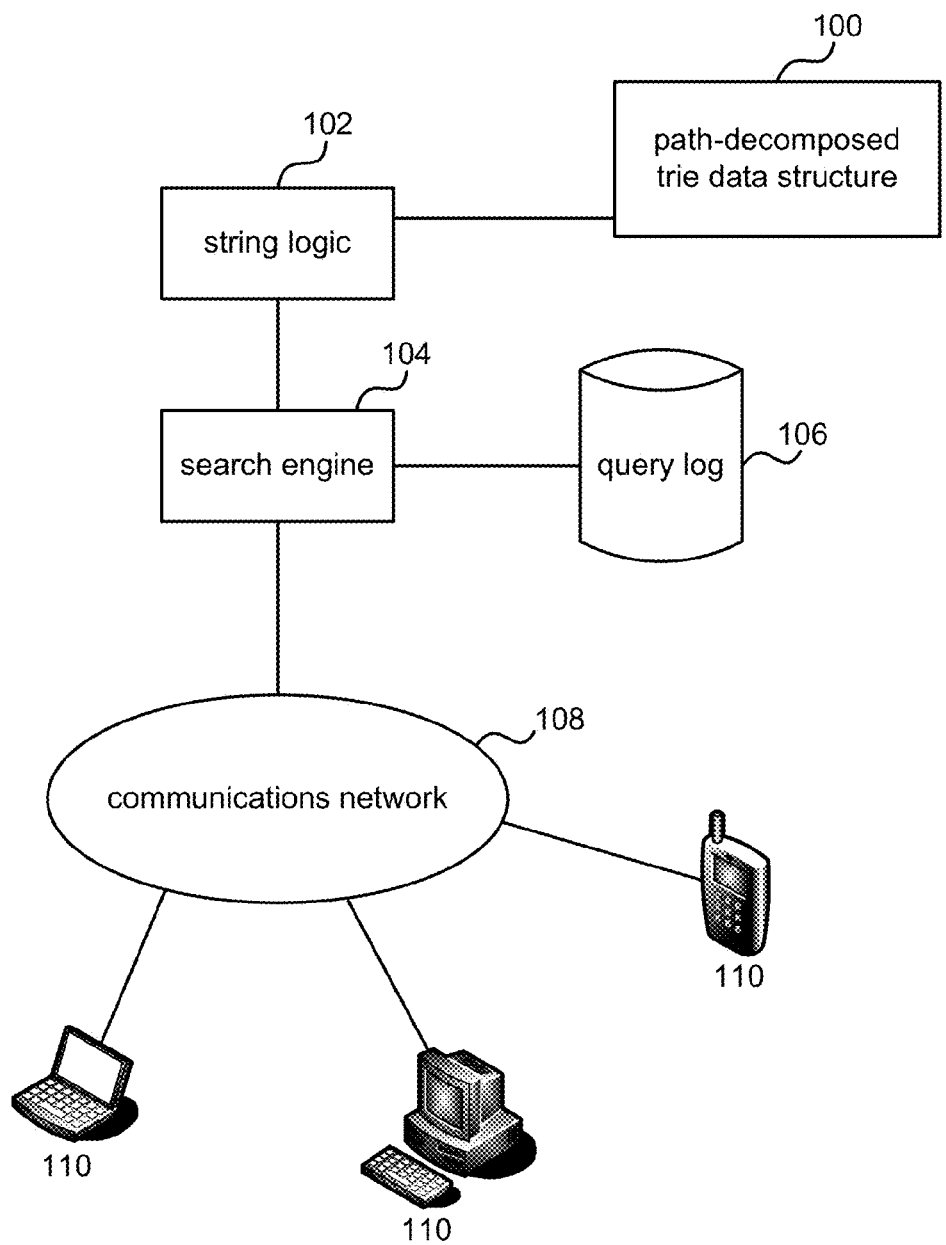
FIG. 1 is a schematic diagram of a path-decomposed trie data structure used in conjunction with a search engine in an information retrieval system.

FIG. 1 is a schematic diagram of a path-decomposed trie data structure 100 used in conjunction with a search engine 104 in an information retrieval system. For example, end users are able to issue queries to the search engine 104 from computing devices 110 over a communications network 108. The search engine may store the queries in a query log 106 for use in improving relevance of retrieved results or other purposes. The query log comprises a set of strings which are the queries submitted by the end users and this set may be extremely large. A string logic 102 may be arranged to form the path-decomposed trie data structure 100 from a set of strings from the query log 106. The path-decomposed trie data structure 100 is a representation of the set of strings which is much smaller in size than the string set. In some embodiments the path-decomposed trie data structure 100 is a string dictionary for the string set. In this case the string logic 102 may be arranged to issue queries to the path-decomposed trie data structure 100, for example, to lookup a given string in the dictionary or to retrieve a string with a specified identifier from the dictionary. In some embodiments the path decomposed trie data structure 100 is used as a hash function. In this case the string logic 102 may be arranged to issue a string to the path-decomposed trie data structure 100 and receive an integer hash value in return, or to receive a hash value and to return a string.

The example of FIG. 1 illustrates the use of a path-decomposed trie data structure in the context of information retrieval. This is just one example; the data structures may be used in any application in which sets of strings are to be manipulated.

Figure 2:
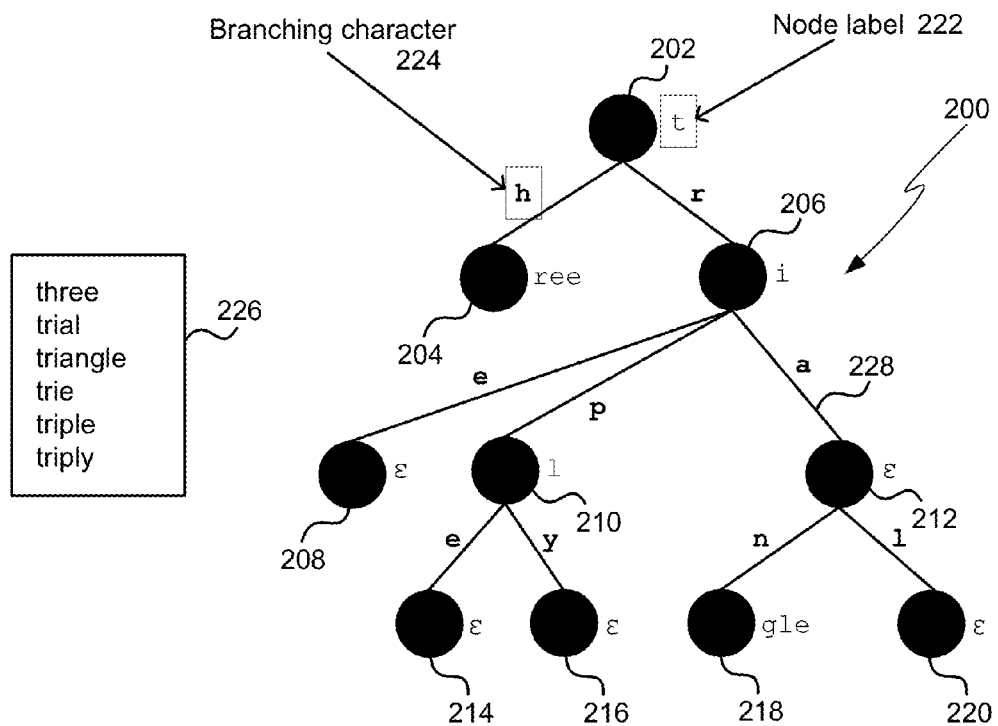
FIG. 2 is a schematic diagram of a trie data structure.

FIG. 2 is a schematic diagram of a trie data structure. It comprises a root node 202, a plurality of internal nodes 204, 206, 208, 210, 212 and a plurality of leaf nodes 214, 216, 218, 220 where the nodes are connected to form a tree structure using branches 228. Each node has a label 222 which is part of a string and these are arranged so that string pre-fixes which are common to two or more strings in a string set 226 are represented by common (the same) root to node paths. For example, the string set in FIG. 1 has 5 strings which share the prefix "tr" and these are all represented by the same root to node path which is root node 202 to internal node 206. Each branch has a branching character 224 which is a character in whichever alphabet is used to form the string set. A branching character indicates a sub set of the alphabet from which dependent nodes of the trie are formed. The lengths of the labels may be referred to as skips. For example, root node 202 has a label 222 which is "t" with length l; leaf node 204 has a label "ree" with length 3. The symbol "ϵ" is used to represent an empty string.

The trie data structure of FIG. 2 may be referred to as a compacted trie. It may be formed from the string set 226 by labeling the root of the tree with the longest common prefix of the strings in the string set 226. If there is no common prefix the label will be the empty string. For each string in the dictionary, the character immediately following the prefix is then used as a branching character. In the example in FIG. 2 these are h and r as the common prefix at the root is t. For each branching character (no duplicates) the compacted trie built on the remaining parts of the strings following the branching character is attached to the root node. This process repeats recursively until all the characters in all the strings are processed.

For example, in FIG. 1 there is only one string "three" in the dictionary with more characters "ree" after "th". The characters "ree" become the label of a child node 204 of the root since "ree" is the longest common prefix of the one string three. There are 5 strings with more characters after "tr" and these have the common prefix "l" which is then the label of node 206. From these five branching characters are identified as a, e and p and so nodes 208, 210, 212 are formed as children of node 206. There are no more strings which have not already been represented which have characters after "trie" and so node 208 has the empty string as label. There are two strings with more characters after "trip" ("triple" and "triply"). The longest common prefix here is "l" and so node 210 takes label "l". This process repeats to form the compacted trie of FIG. 2.

Figure 3:
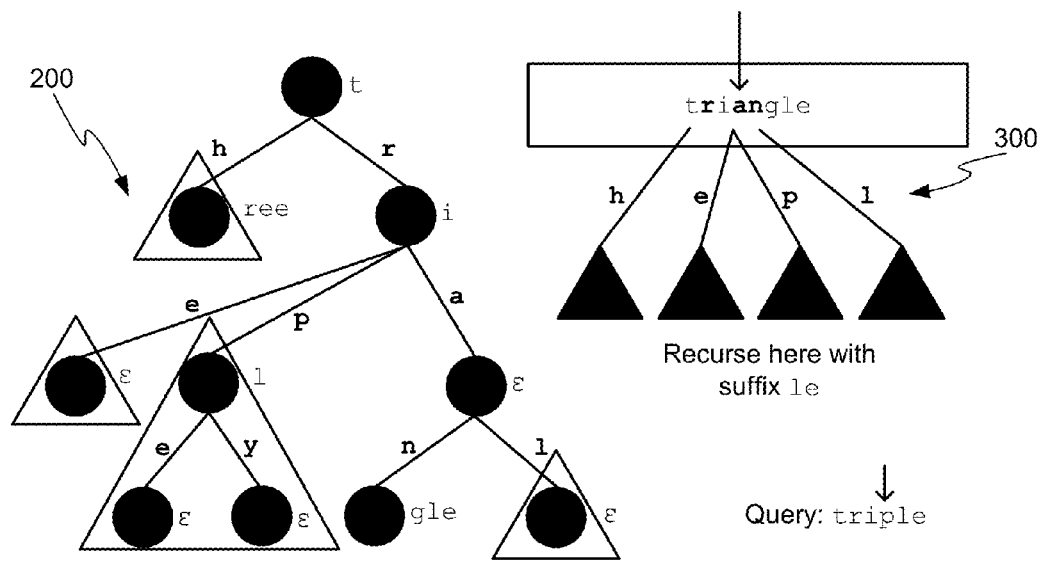
FIG. 3 is a schematic diagram of a path-decomposed trie.

FIG. 3 is a schematic diagram of the compacted trie structure of FIG. 2 and illustrating how the compacted trie structure undergoes path decomposition to form a path-decomposed trie 300. A path-decomposed trie is a trie where each node in the path-decomposed trie represents a path in the trie. A path-decomposed trie may be defined recursively in the following way: a root-to-leaf path in a compacted trie is chosen and represented by the root node in the path-decomposed trie. The same procedure is applied recursively to the sub-tries hanging off a chosen path, and the obtained trees become the children of the root. The sub-tries may be arranged in any order. In some examples they are arranged in bottom-to-top left-to-right order as this simplifies traversal operations when the data structure is used. In the example of FIG. 3 a compacted trie 200 is illustrated (this is the same trie as that of FIG. 2) and its corresponding path decomposed trie 300.

There is a one-to-one correspondence on the paths of a compacted trie and the nodes of its associated path-decomposed trie. That is, root-to-node paths in a compacted trie correspond to root-to-leaf paths in the corresponding compacted trie and hence to strings in the string set. The path decomposed trie has the same number of nodes as there are strings in the string set and has a height which is not larger than that of the compacted trie. Different strategies in choosing the paths in the decomposition give rise to different properties. For example, one strategy may be to always choose the leftmost child. This is referred to herein as a lexicographic path decomposition where the compacted trie is lexicographically ordered. Another strategy may be to always choose the heavy child (i.e. the one whose sub-trie has the most leaves (arbitrarily breaking ties)). This strategy is referred to herein as a choosing a centroid path or as a centroid path decomposition.

It is recognized herein that since each node in the path-decomposed tree corresponds to a node-to-leaf path in its corresponding compacted trie, then the concatenation of the labels in the node-to-leaf path corresponds to a suffix of a string the in the string set. Therefore to simulate a traversal of a compacted trie using its corresponding path-decomposed trie it is possible to scan sequentially character-by-character the label of each node until the needed child node is found. Therefore any representation of the labels which supports sequential access (simpler than random access) is sufficient. This is cache-friendly and allows an efficient compression of the labels.

Figure 4:
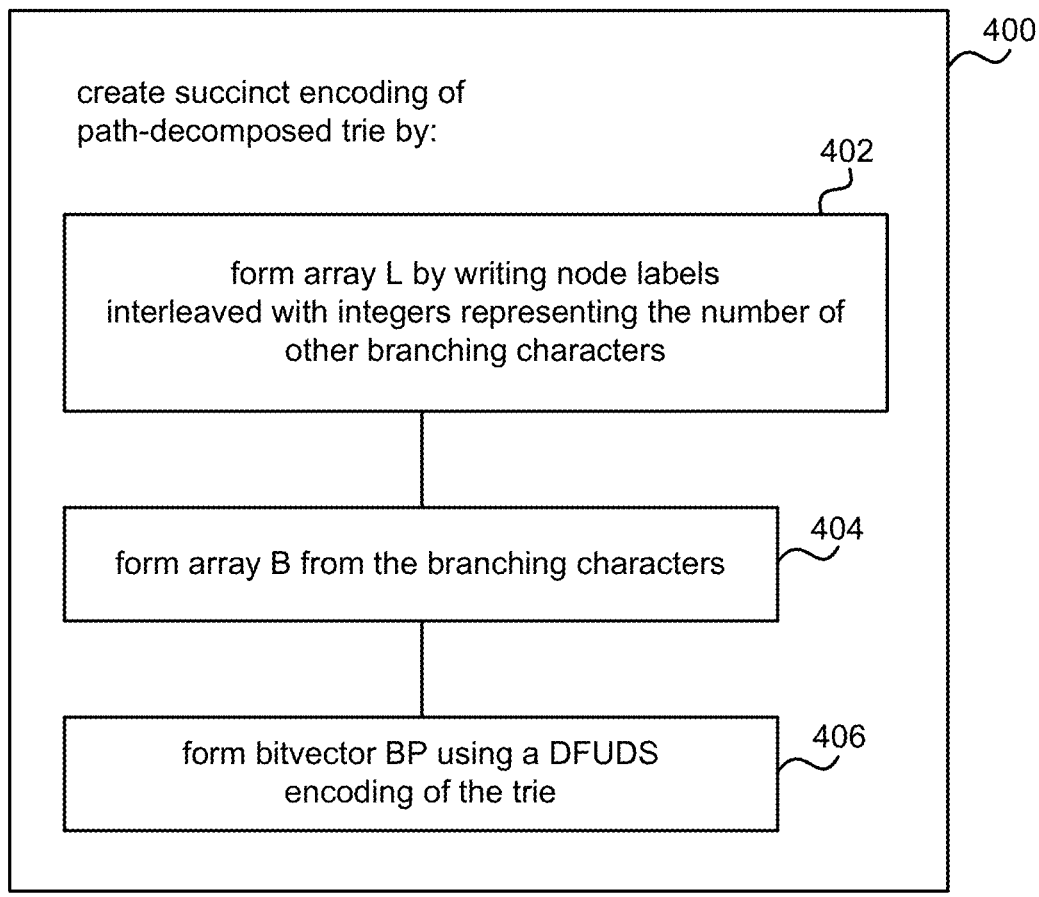
FIG. 4 is a flow diagram of a method of forming a succinct encoding of a path-decomposed trie.

A data structure representing a path-decomposed trie may be formed as described with reference to FIG. 4. A succinct encoding of a path-decomposed trie is formed 400 by forming a plurality of arrays and a bitvector. A first one of the arrays L may be formed 402 by writing node labels of the path-decomposed trie interleaved with integers where the integers represent the number of other branching characters at that point in array L. A second one of the arrays B may be formed 404 from the branching characters of the path-decomposed trie. A bitvector BP may be formed 406 representing the tree topology using a balanced parentheses sequence such as a depth first unary degree sequence (DFUDS) encoding of the topology of the path-decomposed trie. In a sequence of balanced parentheses each open parenthesis (may be associated to its mate). Operations FindClose and FindOpen may be defined which find the mate of respectively an open and closed parenthesis. The sequences may be represented as bitvectors where 1 represents "(" and 0 represents ")". DFUDS is described in detail in Benoit et al. "Representing trees of higher degree" Algorithmica, 43(4):275-292, 2005 which is incorporated herein by reference in its entirety.

Figure 5:
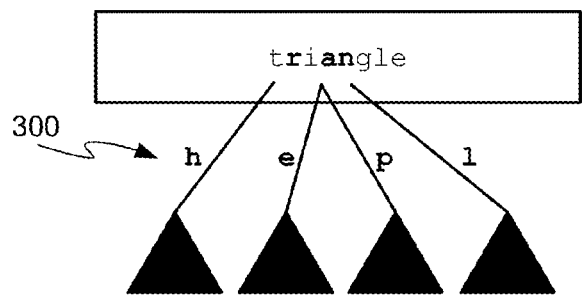
FIG. 5 is a schematic diagram of a succinct encoding of a path-decomposed trie.

FIG. 5 shows the path-decomposed trie 300 of FIG. 3 and its corresponding data structure comprises arrays L and B and bit vector BP.

A path-decomposed trie may be represented with three sequences, a bit vector BP, an array B and an array L as now described:

The bitvector BP encodes the trie topology using DFUDS: each node is represented as a run of opening parentheses "(" of length the degree of the node, followed by a single closing parenthesis ")"; the node representations are then concatenated in depth-first order.

The array B contains the branching characters of each node: they are written in reverse order per node, and then concatenated in depth-first order. Note that the branching characters are in one-to-one correspondence with the opening parentheses "(" of BP.

The array L contains the labels of each node. Each label represents a path in the trie. The path may be encoded by augmenting the alphabet used for the string set with the same number of special characters (for example integers) as there are in the alphabet. The label and the branching char of each node in the path are alternated with the number of sub-tries hanging off that node, encoded with the new special characters. The representations of the labels are concatenated in depth-first order in the sequence L, so that each label is in correspondence with an opening parenthesis ")" in BP. Note that the labels are represented in a larger alphabet; the labels may be encoded as described in more detail below. Also, since the label representations are variable-sized, their endpoints Elias-Fano sequence may be encoded. An Elias-Fano representation is an encoding scheme to represent a non-decreasing sequence of integers while supporting constant-time access to the i-th integer. Detail of implementation of an Elias-Fano representation is given in Vigna 2008 "Broadword implementation of rank/select queries" in WEA, pages 154-168 which is incorporated herein by reference in its entirety.

The representation described above enables space requirements to be reduces and still enables fast query times. For example, to implement Lookup the following process may be used. Lookup takes a string and returns −1 if the string is not a member of the string set or returns a unique identifier (from 0 to the number of strings in the set minus 1) of the string.

Start from the root and begin scanning its label. If the character of the label is a special character, add it to an accumulator, otherwise check for a mismatch with the string at the current position. When there is a mismatch, the accumulator indicates the range of children of the root (and thus of branching characters) that branch from that point in the path in the original trie. Hence the process finds the right branching character (or concludes that that there is none, i.e. the string was not in the set) and then the child where to jump. The process proceeds recursively until the string is fully consumed or it cannot be extended further: the index returned is the value of Rank) for the final node in the former case (i.e. the depth-first index of that node), or −1 in the latter case. Note that it is possible to avoid all the Rank calls needed to access L and B by using double-counting, exploiting the observation that between two mates there is an equal number of "(" s and ")"s.

Rank and Select operations may be defined as follows given a bitvector X:

Rankb(i) returns the number of occurrences of bit b (b can be 0 or 1) in the first i positions in X;

Selectb(i) returns the position of the i-th occurrence of bit b in X.

Figure 6:
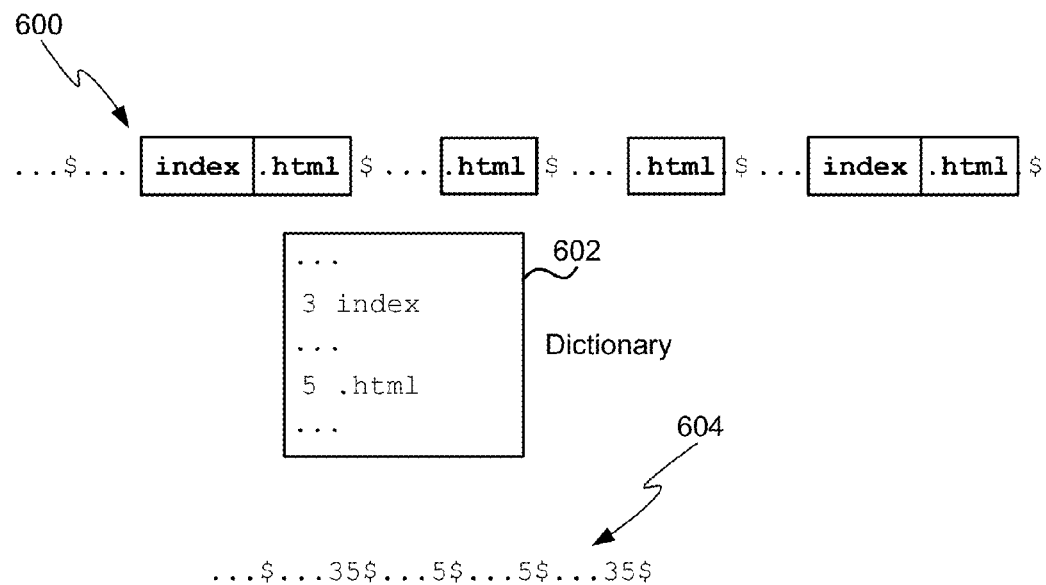
FIG. 6 is a schematic diagram of use of a dictionary to compress part of an encoding of a path-decomposed trie.

In some examples the labels in array L may be compressed with an almost negligible overhead in the operations. This may be achieved by using a static dictionary compression of the labels. For example, FIG. 6 schematically illustrates part of an array L 600. Suffixes of some of the labels are shown and in this example are index.html and .html. Label boundaries are indicated by dollar signs. A static dictionary 602 is available having codewords and associated integers. In the example shown in FIG. 6 codeword "index" is associated with integer 3 and codeword ".html" is associated with integer 5. The codewords are identified in the array L and replaced by the associated integers to form a compressed version of the array L 604.

The dictionary codewords are shared amongst the labels but do not cross label boundaries. The codeword identifiers may themselves be compressed using any suitable compression scheme such as vbyte encoding.

More detail about a dictionary compression scheme that may be used for the labels is now given. A static dictionary of variable-sized words is chosen (drawn from any alphabet) that may be stored along the tree explicitly, such that the overall size of the dictionary is bounded by a given parameter (constant) D. The node labels may be parsed into words of the dictionary, and the words are sorted according to their frequency in the parsing: a code is assigned to each word in decreasing order of frequency, so that more frequent words have smaller codes. The codes are then encoded using some variable-length integer encoding; such as vbyte as mentioned above. To decompress the label, scan the codes and for each code scan the word in the dictionary, hence each character requires a constant amount of work.

The decompression algorithm is completely agnostic of how the dictionary was chosen and how the strings are parsed. For example, domain knowledge about the data may be exploited. For example, where the string set is from text, the frequency of words in the language used for the texts may be used to influence the decompression algorithm.

An example of a dictionary compression scheme comprises initializing the dictionary to an alphabet and scanning the string to find the k most frequent pairs of codes. The process selects all the pairs whose corresponding substrings fit in the dictionary and substitute them in the sequence. The process iterates until the dictionary is filled (or there are no more repeated pairs). From this is obtained both the dictionary and the parsing. To allow the labels to be accessed independently, no pairs are formed on label boundaries.

In some embodiments a path-decomposed trie is used to compute the hash value of a string. The path-decomposed trie may be arranged so that the hash function it enables is a monotone minimal perfect hash function. A hash function for a set of strings is a one way function which takes a string from a set of strings and returns a hash value such as an integer. The hash function is a perfect one when it has no collisions; a collision occurs when two different strings from the set return the same hash value. The hash function is minimal if the hashes of n strings range between 1 and n. A monotone hash function for strings preserves the lexicographic order of the strings.

As mentioned above, the path-decomposed trie may be arranged so that the hash function it enables is a monotone minimal perfect hash function. This is done by making the compacted trie (such as the one of FIG. 2) into a hollow trie by making it a binary tree where only the trie topology (BP bit vector) and the skips of the internal nodes are stored. A binary tree is a tree structure with a maximum of two children at each node. To enable a binary tree to be used the strings are converted to a binary alphabet. The hollow trie undergoes path-decomposition to form a path-decomposed trie. The resulting path-decomposed trie may be represented using a BP bit vector as described above together with two aligned bit vectors Lhigh and Llow which are described below in more detail.

To compute the hash value of a string a blind search is performed on the path-decomposed hollow trie. The blind search comprises traversing the trie matching only the branching characters of the string for which the hash value is to be computed. If the string is a member of the string set used to form the path-decomposed hollow trie then the leaf reaches is the correct one and its unique identifier is returned. Otherwise it has the longest prefix match with the string.

More detail about the path-decomposition process is now given. The sub-tries are arranged in lexicographic order. This means that the sub-tries on the left of the path are arranged top-to-bottom, and precede all those on the right which are arranged bottom-to-top. In the path decomposition tree refer to the left children as the ones corresponding to sub-tries hanging off the left side of the path and right children as the ones corresponding to those hanging on the right side.

A change in the heavy path strategy is made: instead of breaking ties arbitrarily, choose the left child. This strategy may be referred to as left-biased heavy path, which gives the following: every node-to-leaf left-biased heavy path in a binary trie ends with a left turn. Hence, every internal node of the resulting path decomposition has at least one right child.

The path-decomposed hollow trie may be represented using a bit vector BP for the trie topology and two aligned bitvectors Lhigh and Llow to represent the labels. A label is a sequence of skips interleaved with directions taken in a centroid path.

Figure 7:
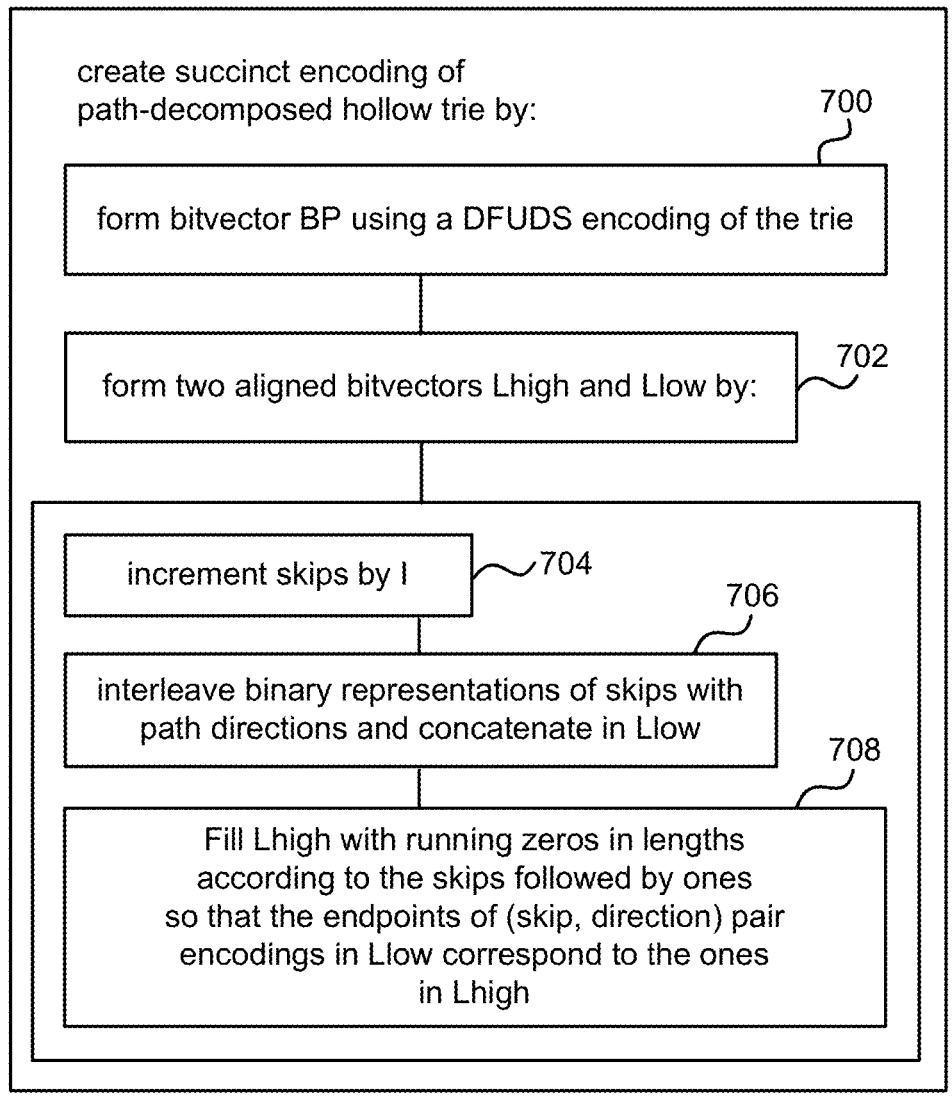
FIG. 7 is a flow diagram of a method of forming a succinct encoding of a path-decomposed hollow trie.

With reference to FIG. 7 the bitvector BP is formed 700 as described above. The label associated with each node is the sequence of skips interleaved with directions taken in the centroid path, excluding the leaf skip. Two aligned bitvectors Lhigh and Llow are formed 702 to represent the labels using an encoding as now described. The skips are incremented 704 by one (to exclude 0 from the domain) and their binary representations (without the leading 1) are interleaved with the path directions and concatenated 706 in Llow. Lhigh consists of zeros running 708 in lengths corresponding to the lengths of the binary representations of the skips, followed by 1 s, so that the endpoints of (skip, direction) pair encodings in Llow correspond to the 1 s in Lhigh. Thus a Select directory on Lhigh enables random access to the (skip, direction) pairs sequence. The labels of the node are concatenated in depth-first order: the "("s in BP are in one-to-one correspondence with the (skip, direction) pairs.

A trie traversal is simulated on the path-decomposed trie. In the root node, the (skip, direction) pairs sequence is scanned (through Lhigh and Llow): during the scan the number of left and right children passed by is kept; when a mismatch in the string is found, the search proceeds in the corresponding child. Because of the ordering of the children, if the mismatch leads to a left child the child index is the number of left children seen in the scan, while if it leads to a right child it is the node degrees minus the number of right children seen (because the latter are stored from right to left). The search proceeds recursively until the string's characters are consumed.

When the search ends, the depth-first order of the node found is not yet the number needed: all the ancestors where the process turned left come before the found node in depth-first but after in the lexicographic order. Besides, if the found node is not a leaf, all the strings in the left sub-tries of the corresponding path are lexicographically smaller than the current string. To address these issues: during the traversal the process may count the number of left turns and subtract that from the final index. To account for the left sub-tries it is possible to count the number of their leaves by jumping to the first right child with a FindClose: the number of nodes skipped in the jump is equal to the number of leaves in the left sub-tries of the node.

Figure 8:
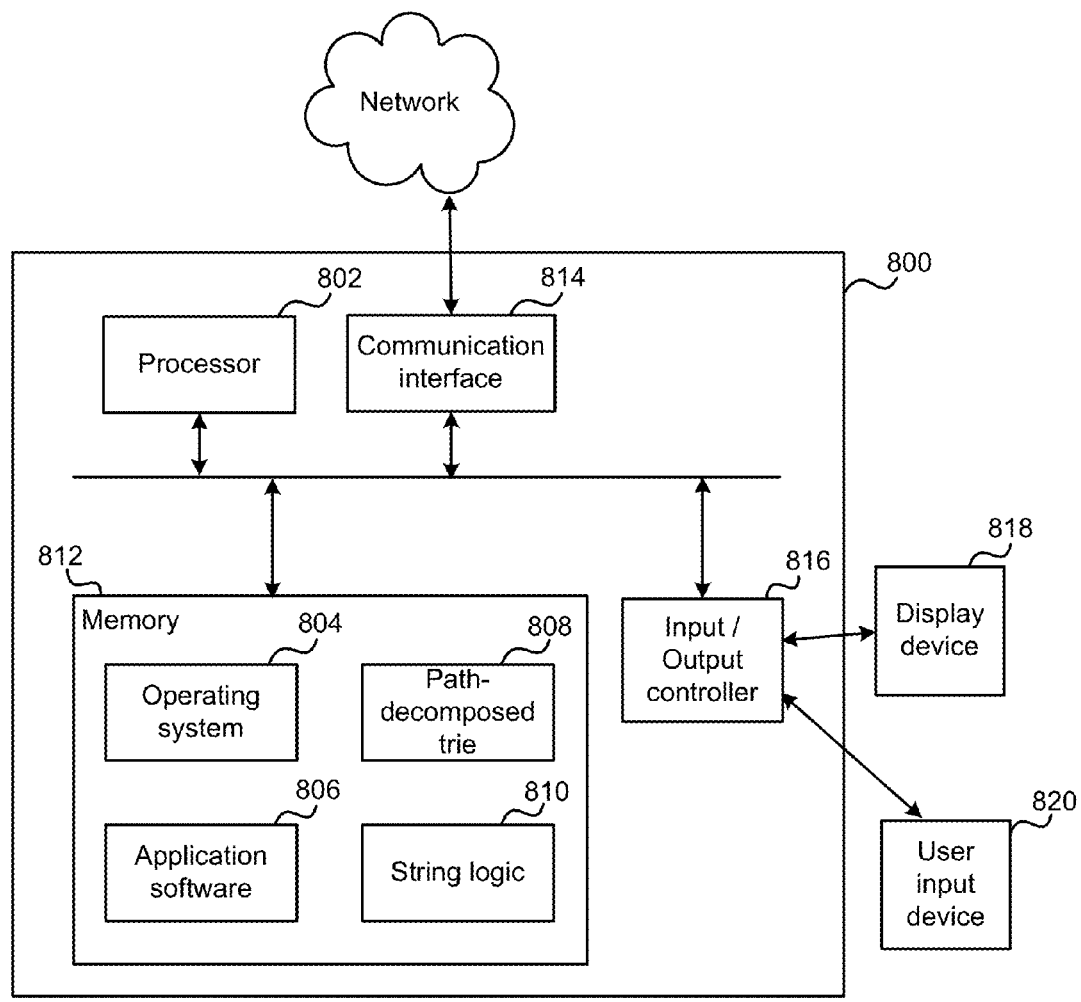
FIG. 8 illustrates an exemplary computing-based device in which embodiments of path-decomposed trie data structures may be implemented.

FIG. 8 illustrates various components of an exemplary computing-based device 800 which may be implemented as any form of a computing and/or electronic device, and in which embodiments of systems using path-decomposed trie data structures may be implemented.

Computing-based device 800 comprises one or more processors 802 which may be microprocessors, controllers or any other suitable type of processors for processing computer executable instructions to control the operation of the device in order to form path-decomposed trie data structures and/or use those data structures. In some examples, for example where a system on a chip architecture is used, the processors 802 may include one or more fixed function blocks (also referred to as accelerators) which implement a part of the method of forming or using path-decomposed trie data structures in hardware (rather than software or firmware). Platform software comprising an operating system 804 or any other suitable platform software may be provided at the computing-based device to enable application software 806 to be executed on the device. One or more path-decomposed trie data structures 808 may be stored at the computing-based device and string logic 810 may be provided to enable the path-decomposed trie data structures 808 to be queried or manipulated as described herein.

The computer executable instructions may be provided using any computer-readable media that is accessible by computing based device 800. Computer-readable media may include, for example, computer storage media such as memory 812 and communications media. Computer storage media, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 812) is shown within the computing-based device 800 it will be appreciated that the storage may be distributed or located remotely and accessed via a network or other communication link (e.g. using communication interface 814).

The computing-based device 800 also comprises an input/output controller 816 arranged to output display information to a display device 818 which may be separate from or integral to the computing-based device 800. The display information may provide a graphical user interface. The input/output controller 816 is also arranged to receive and process input from one or more devices, such as a user input device 820 (e.g. a mouse, keyboard, camera, microphone or other sensor). In some examples the user input device 820 may detect voice input, user gestures or other user actions and may provide a natural user interface. This user input may be used to send queries to a path-decomposed trie or to control parameters of path-decomposed tries for example. In an embodiment the display device 820 may also act as the user input device 820 if it is a touch sensitive display device. The input/output controller 816 may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising:
a processor coupled to a memory, the processor configured to execute computer-executable instructions to:
provide a plurality of arrays and a bit vector together representing a path-decomposed trie, wherein the path-decomposed trie is a compressed tree structure having a root connected to a plurality of nodes by branches where terminal nodes are leaves, the compressed tree structure representing a set of strings where prefixes common to two or more strings are represented by a same root-to-node path,
wherein each node has a degree being a number of child nodes branching from the node, and wherein each node has a plurality of labels, the path-decomposed trie representing root-to-leaf paths of the compressed tree structure by a single node in the path-decomposed trie; and use the path-decomposed trie to return an identifier of a string in the path-decomposed trie or to obtain an indication that the string is not present in the path-decomposed trie, and wherein using the path-decomposed trie comprises performing a sequential search of the plurality of labels represented in the plurality of arrays, each label is a set of characters of the string and a first one of the plurality of arrays stores the labels of the path-decomposed trie by interleaving the labels with the node degrees.

2. A system as claimed in claim 1, wherein the labels are concatenated according to a depth-first order in the path-decomposed trie.

3. A system as claimed in claim 1 further comprising an associated static dictionary and wherein a first one of the plurality of arrays comprises labels which have been compressed by replacing them by codewords of the static dictionary.

4. A system as claimed in claim 1, wherein the processor is configured to execute further computer-executable instructions to compute a hash value of the string by making a blind search for the string in the path-decomposed trie, the blind search being one in which the path-decomposed trie is traversed matching only the branching characters of the string.

5. A system as claimed in claim 1, wherein the processor is configured to execute further computer-executable instructions to compute a minimal, perfect hash value of the string by making a blind search for the string in the path-decomposed trie, a blind search being one in which the path-decomposed trie is traversed matching only the branching characters of the string, the minimal perfect hash value being one which produces minimal collisions.

6. A system as claimed in claim 1, wherein the processor is configured to execute further computer-executable instructions to compute a monotone, minimal, perfect hash value of the string by making a blind search for the string in the path-decomposed trie, a blind search being one in which the path-decomposed trie is traversed matching only the branching characters of the string, the monotone minimal perfect hash value being one which preserves a lexicographic order of the strings.

7. A method for retrieving a set of strings comprising:
providing a plurality of arrays and a bit vector together representing a path-decomposed trie, wherein the path-decomposed trie is a compressed tree structure having a root connected to a plurality of nodes by branches where terminal nodes are leaves, the compressed tree structure representing a set of strings where prefixes common to two or more strings are represented by a same root-to-node path,
wherein each node has a degree being a number of child nodes branching from the node, and wherein each node has a plurality of labels, the path-decomposed trie representing root-to-leaf paths of the compressed tree structure by a single node in the path-decomposed trie; and
using the path-decomposed trie to return an identifier of a string in the path-decomposed trie or to obtain an indication that the string is not present in the path-decomposed trie, wherein using the path-decomposed trie comprises performing a sequential search of the plurality of labels represented in the plurality of arrays, each label is a set of characters of the string and a first one of the plurality of arrays stores the labels of the path-decomposed trie by interleaving the labels with the node degrees.

8. A method as claimed in claim 7, wherein the labels are concatenated according to a depth-first order in the path-decomposed trie.

9. A method as claimed in claim 7 further comprising an associated static dictionary and wherein a first one of the plurality of arrays comprises labels which have been compressed by replacing them by codewords of the static dictionary.

10. A method as claimed in claim 7, further comprising computing a hash value of the string by making a blind search for the string in the stored path-decomposed trie, the blind search being one in which the path-decomposed trie is traversed matching only the branching characters of the string.

11. A method as claimed in claim 7, further comprising computing a minimal, perfect hash value of the string by making a blind search for the string in the stored path-decomposed trie, a blind search being one in which the path-decomposed trie is traversed matching only the branching characters of the string, the minimal perfect hash value being one which produces minimal collisions.

12. A method as claimed in claim 7, further comprising computing a monotone, minimal, perfect hash value of the string by making a blind search for the string in the stored path-decomposed trie, a blind search being one in which the path-decomposed trie is traversed matching only the branching characters of the string, the monotone minimal perfect hash value being one which preserves a lexicographic order of the strings.

13. A device comprising:
a processor coupled to a memory, the processor configured to execute computer-executable instructions to:
store a plurality of arrays and a bit vector together representing a path-decomposed trie, wherein the path-decomposed trie is a compressed tree structure having a root connected to a plurality of nodes by branches where terminal nodes are leaves, the compressed tree structure representing a set of strings where prefixes common to two or more strings are represented by a same root-to-node path,
wherein each node has a degree being a number of child nodes branching from the node, and wherein each node has a plurality of labels, the path-decomposed trie representing root-to-leaf paths of the compressed tree structure by a single node in the path-decomposed trie; and
using the path-decomposed trie to return an identifier of a string in the path-decomposed trie or to obtain an indication that the string is not present in the path-decomposed trie, wherein using the path-decomposed trie comprises performing a sequential search of the plurality of labels represented in the plurality of arrays, each label is a set of characters of the string and a first one of the plurality of arrays stores the labels of the path-decomposed trie by interleaving the labels with the node degrees.

14. A device as claimed in claim 13, wherein the labels are concatenated according to a depth-first order in the path-decomposed trie.

15. A device as claimed in claim 13, further comprising an associated static dictionary and wherein a first one of the plurality of arrays comprises labels which have been compressed by replacing them by codewords of the static dictionary.

16. A device as claimed in claim 13, wherein the path-decomposed trie is a binary tree and is hollow in that the labels comprise only a skip sequence interleaved with directions taken in a centroid path, and a first one of the plurality of arrays stores the labels of the path-decomposed trie by interleaving the labels with the directions.

17. A device as claimed in claim 16, wherein the first one of the plurality of arrays comprises two aligned bit vectors to represent the labels, in a first of the two aligned bit vectors the skips are incremented by one and binary representations of the skips are interleaved with the directions and concatenated.

18. A device as claimed in claim 17, wherein a second of the two aligned bit vectors comprises lengths of zeros corresponding to lengths of the binary representations of the skips, followed by ones, so that the endpoints of skip-direction pair encodings in the first of the two aligned bit vectors correspond to the ones in the second of the two aligned bit vectors.

19. A device as claimed in claim 13, wherein the bit vector stores a tree topology using a first and a second symbol, each node being represented as a run of first symbols of length the degree of the node, followed by a single second symbol, the node representations being concatenated in depth-first order in the bit vector.

20. A device as claimed in claim 13, wherein a first one of the arrays stores a branching character of each node written in reverse order per node and concatenated in depth-first order, wherein the branching character is a character in an alphabet from which the strings are formed which indicates a subset of string suffixes from which dependent nodes of the path-decomposed trie are formed.

* * * * *